Dec. 15, 1959 R. H. ENGELMANN ET AL 2,917,666
MOMENTARY ELECTRICAL OVERRIDE FOR HEADLIGHT CONTROL SYSTEM
Filed Feb. 18, 1958 2 Sheets-Sheet 1
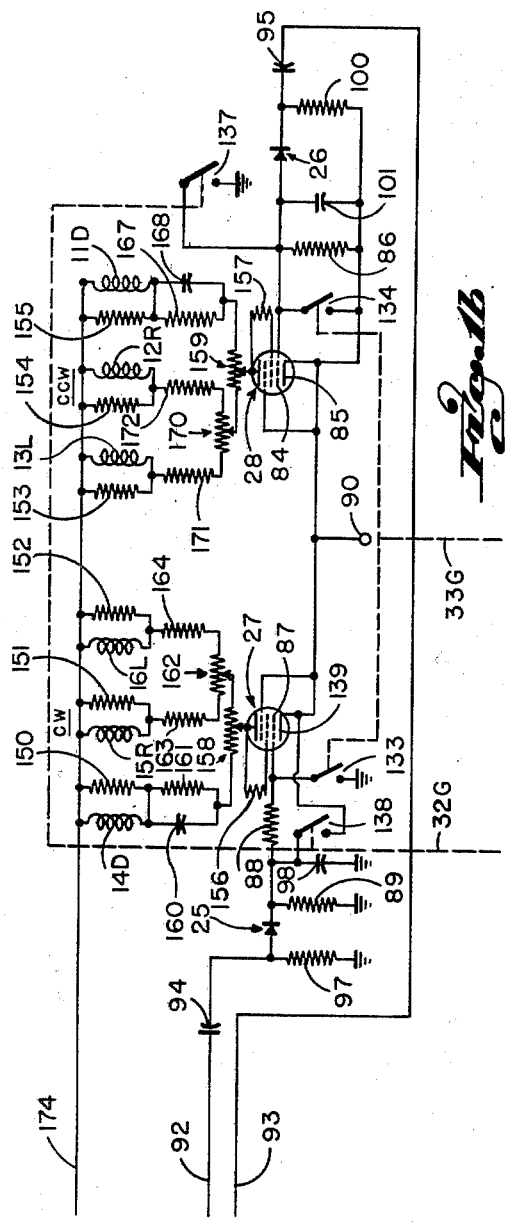
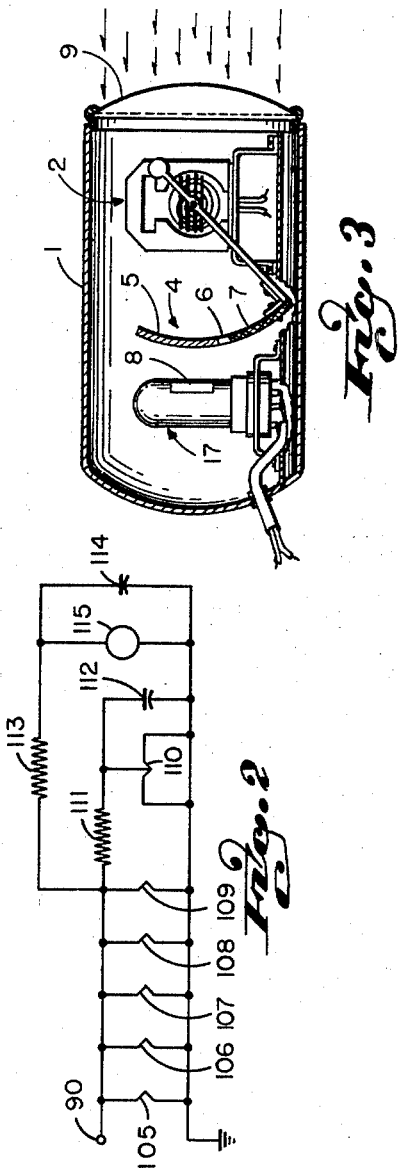
INVENTORS.
RICHARD H. ENGELMANN.
FRANK M. FOSTER
BY
Charles M. Hogan
ATTORNEY

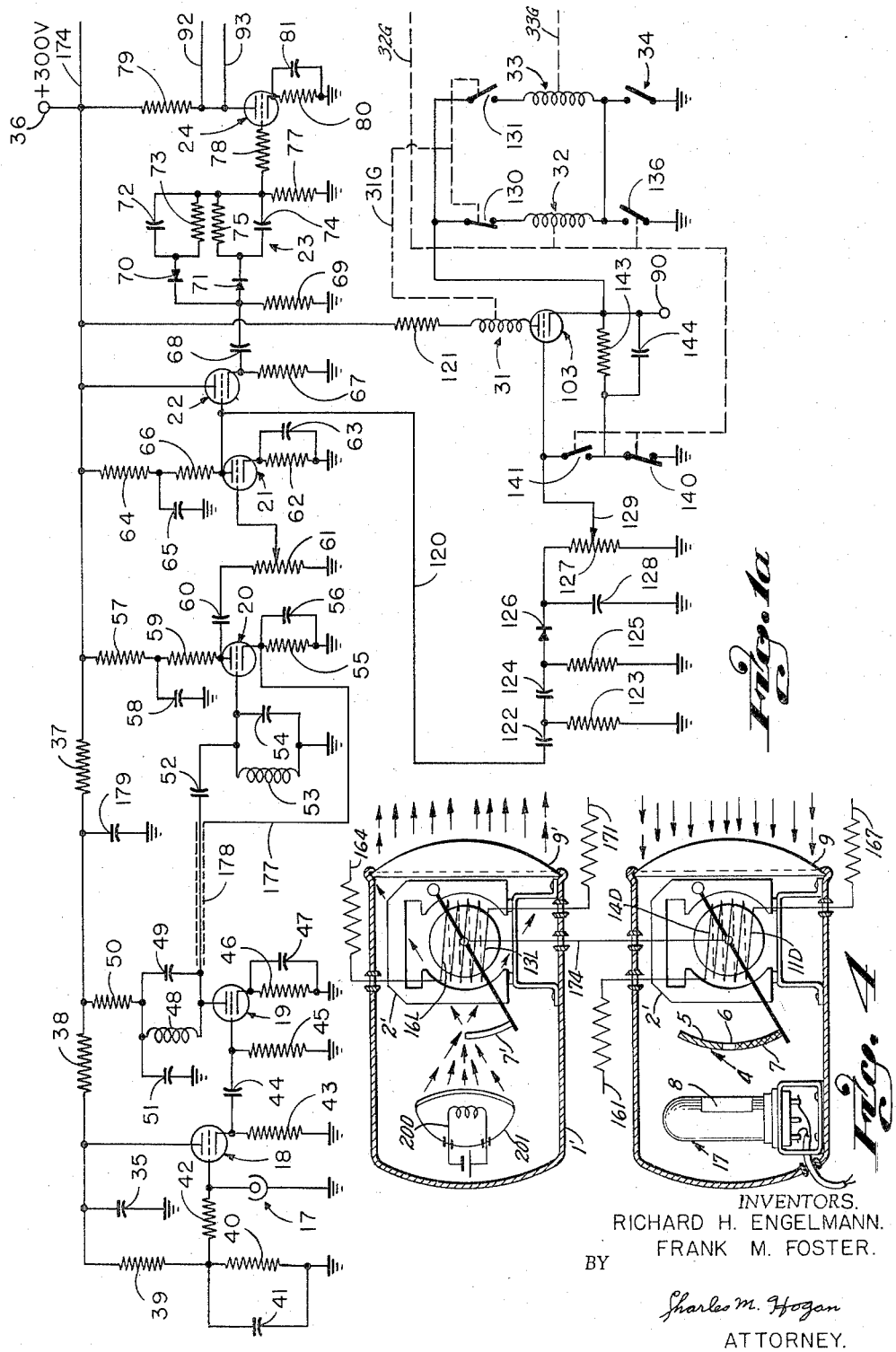

United States Patent Office 2,917,666
Patented Dec. 15, 1959

2,917,666

MOMENTARY ELECTRICAL OVERRIDE FOR HEADLIGHT CONTROL SYSTEM

Richard H. Engelmann and Frank M. Foster, Cincinnati, Ohio, assignors, by mesne assignments, to J. Page Hayden, Cincinnati, Ohio Application February 18, 1958, Serial No. 715,875

16 Claims. (Cl. 315—83)

The present invention relates to headlight control systems generally and specifically to improvements in the basic Bone type of control system illustrated in United States Patents Nos. 2,562,258 and 2,753,487, issued to Evan P. Bone and assigned to J. Page Hayden, of Cincinnati, Ohio.

The Bone headlight control system is an electrical and optical installation in an automobile (i.e. equipped vehicle) which so functions that a non-glare shadow automatically is cast on the zone of an oncoming vehicle, as the passing approach is made, in order to protect its operator from disability and discomfort glare. The Bone system functions in such a way that light of such intensity as to effect greatly improved night visibility for the driver of the equipped vehicle continues to be projected onto the right side of the road in front of the equipped vehicle throughout the approach and until the approaching vehicles come alongside each other.

The system is premised generally on a direction finder including photoelectric means for detecting the presence of an oncoming vehicle, in combination with a vane which is positioned in azimuth, under the ultimate control of the photoelectric means, to measure the direction of approach of the oncoming vehicle (specifically, the relative bearing of the left or inner headlamp of the approaching vehicle, "inner" meaning closer to the center line of the highway). Synchronized with the direction finder vane are vanes in the head lamps which function in such a way as to define the projection of light and to cause the shadow or non-glare area to track the approaching vehicle until it passes or comes alongside the equipped car, all as described in detail in the aforementioned Bone patents, to which reference is made for a full description of the basic system relative to which the present invention constitutes an improvement. It will be understood that the full benefits of the basic system, i.e., safe night visibility and absence of disability and discomfort glare, are realized when both vehicles are equipped, but the system possesses the advantage of compatibility in that each equipped car operator has greater night visibility and the operator of every car approaching him is protected from glare.

Referring briefly to Fig. 3, before discussing the objects of the invention, there is shown a Bone-type direction finder comprising a casing 1, galvanometer movement, phototube 17, and arcuate shutter 4, positioned in azimuth by the galvanometer 2. The angular operating position of the shutter is indicative of the relative bearing of the oncoming vehicle. The shutter is formed with a graduated filter or semi-transparent area 5, a clear area 6 and an opaque area 7. The entire system is so arranged that when power is supplied and the equipped car moves down the road at night with no approaching vehicle in range, the filter 5 covers the phototube light-admitting aperture 8. The direction finder vane is then in the quiescent or retracted position (counterclockwise), and the headlamp vanes are so positioned (counterclockwise) that the full illumination of the headlamps is cast down the road. In this position of the direction finder vane, the filter strongly attenuates light coming toward the equipped car from regions to the right of the center line of the direction finder's field of view, and less strongly attenuates light from regions to the left of such center line. When an oncoming car enters into such field of view, and light from its inner headlamp reaches a predetermined value, the phototube signal output causes the vane to swing clockwise. The image of the oncoming car's headlamp is, as the vane swings clockwise, in progressively less dense portions of filter 5, causing increasing phototube output and increasing the swing on the vane until such a position is reached that clear area 6 registers with aperture 8. The attainment of this position by the vane permits full light from the oncoming headlamp to pass to the phototube. In other words, this is the "pickup position." As explained in the aforementioned Bone patents, the operation of the system is such that, once light from an oncoming approaching vehicle is picked up, the leading edge of opaque area 7 is automatically positioned in such a way as to track or measure the relative bearing of such vehicle and to control events which cause the headlamps of the equipped vehicle to properly angularly position the non-glare shadows they cast. The synchronism between the direction finder vane and the vanes in the headlamps is described in U.S. Patent 2,753,487 to Bone. Referring to Fig. 7 of that patent and Fig. 4 of the present patent application (reference numerals in Fig. 4) the angular position of direction finder vane portion 7 is synchronized with that of headlamp vane 7' (left headlamp shown) in such a way that headlamp vane 7' causes a non-glare shadow to be cast on an oncoming car. In Fig. 4 there are shown the direction finder and the left headlamp, comprising a casing 1', vane 7', vane-positioning galvanometer 2', lens 9', light-emitting filament 200 and reflector 201, all generally as described in Bone Patent 2,753,487. The galvanometer coils, 14D and 11D for the direction finder and 13L and 16L for the head amp, and associated connections, are also shown, the reference numerals being the same as in Figs. 1a, 1b, and 3.

The vanes 7 and 7' illustrated in Fig. 4 are mounted on vertical pivots so that they are angularly positionable in azimuth.

Because of this filter 5 on the direction finder vane, oncoming cars with down beams will approach much closer to the equipped car than will oncoming cars with up beams. The present invention provides a means by which the driver of the equipped car can initiate a "search" operation and cause "pickup" to occur while an oncoming car with down beams is beyond the normal down-beam or dim light pickup range. "Pickup" is characterized by the presentation of clear area 6 to light-admitting slot 8 and by the casting of the protective non-glare shadow from the equipped car to the approaching car. The invention also provides a means by which the driver of the equipped car can initiate a "flash" operation and remove the non-glare shadow from an approaching car when its operator neglects or fails to dim his lights in due season.

Let it be assumed for purposes of discussion that an automobile equipped with the basic Bone system is approaching an oncoming car having standard bright lights energized (i.e. "brights on"). Further assume that the Bone system has "picked up" or responded to light from the oncoming standard vehicle and has cast the non-glare shadow on the left side of the road, so that the operator of the oncoming vehicle is protected from glare. Now postulate that, due to negligence or inattention, the driver of the oncoming vehicle has not "dimmed down." According to conventional practice with headlamps in use today, the aggrieved driver, under such conditions, "flashes" the offending driver by momentarily turning on his bright lights. The offending driver normally responds by switching to his dim lights, i.e., by "dimming down," in observance of law, courtesy and safety.

Returning now to the general operating conditions which have been assumed, and further assuming a Bone-equipped car to be approached by a recalcitrant or inattentive operator of a vehicle having standard headlights, we appreciate that it is desirable to provide, in the Bone type of system, a convenient and effective means whereby the automatic operation of the Bone-equipped car can be momentarily overridden at the will of its driver and the offending oncoming vehicle "flashed" (by momentary removal of the non-glare shadow from his zone) to invite attention to the need for dimming down. It is a primary object of the present invention to satisfy this need and to provide such means. Accordingly, the present invention provides a momentary "flash" system for use with Bone-equipped cars.

Let us now postulate a second set of circumstances occasionally encountered in the operation of a Bone-equipped car when meeting oncoming cars equipped with standard headlights. Let us assume that the driver of the oncoming car manifests noteworthy custom and caution and dims down at a considerable distance, say more than 1500 feet. This distance is mentioned by way of example and not by way of limitation since we have found that in one specific embodiment of the invention, employing phototubes and other components of particular types, the Bone system picks up on the bright lights of oncoming cars at 1500 feet. Under the facts assumed, however, the oncoming driver has dimmed down at a distance beyond that range (bright light pickup range). We have also found that with such particular components, such specific embodiment of the Bone system picks up on oncoming dim lights or low beams at 500 feet (dim light pickup range). It is, therefore, desirable to provide an override arrangement which will cause the Bone system to simulate its oncoming bright-light pickup response, i.e., to place the oncoming driver under the protection of the non-glare shadow, at a range greater than the distance at which oncoming dim lights cause the Bone system to respond but less than the distance at which oncoming bright lights stimulate the Bone system into response (i.e., at a distance between the bright light and dim light pick-up distances). In other words, it is desirable to provide an override arrangement which causes the Bone system to project the non-glare shadow down the road even when the oncoming car is operating on dim lights and is 1500 feet away, for example. It will be understood that operation of such override is not ordinarily dictated when the oncoming car approaches to within 1500 feet on bright lights (i.e., within the bright light pick-up range).

It is therefore another principal object of the invention to provide an override arrangement which satisfies this need. Accordingly, the invention provides a "search" system for use with Bone-type head lamps. The invention further provides an arrangement which will not only respond and cast the non-glare shadow onto the left side of the road under the conditions mentioned, but will position the direction finder vane of the Bone system in such a manner that oncoming dim lights beyond the illustrative range of 500 feet will suffice to stimulate the Bone system into automatic control and maintain it in such control.

Expressing the two major functions of the invention in abbreviated fashion:

First, the "flash" function performed by the invention causes the Bone headlamp vanes momentarily to be positioned in such a way that the oncoming vehicle receives the full intensity of the Bone head lamps. The projection of light from such head lamps is the same under such instantaneous conditions as would be the case if no oncoming vehicle were present at all. The invention provides an override in the sense that such momentary positioning of the headlamp vanes for full road illumination is the result of a manual order and not of automatic operation.

Second, the "search" function of the invention causes the direction finder vane of the Bone system to be positioned in such a way that, although the system is normally actuated by oncoming bright lights, it can, as a result of a manual order, be made to respond at a distance beyond the dim light pickup distance even when the oncoming car does not have its bright lights on. The invention therefore provides an additional override in the sense that the direction finder and headlight vanes are positioned by manual order to cast the non-glare shadow and cause the direction finder to pick up the oncoming car's dim lights in anticipation of the normal automatic operation occasioned by oncoming dim headlamps.

It will be seen from the foregoing that the flash function causes the direction finder and headlamp vanes to be positioned in such a way, in response to a manual order, that no shadow is cast on the road. Conversely, the search function causes the vanes to be positioned in such a way that a shadow is cast on the left side of the road, in response to a manual order. The search function is a compliance with a manual order to pick up. The flash function is a compliance with a manual order momentarily to interrupt pickup. Therefore the vanes are turned counterclockwise for "flash" and clockwise for "search."

A further object of the invention is to provide a single operating means for causing either the search function or the flash function automatically to be performed, as dictated by the prevailing conditions. For example, in the embodiment herein shown, the depression of a foot switch causes the "flash" operation to be performed if the traffic and lighting conditions satisfy the first set of assumptions discussed above. Conversely, the system performs the "search" function if the second set of assumptions prevails. An object of the invention is therefore to provide routing circuitry so that the system itself makes a "logical" decision as to which function is performed in response to the actuation of the single manual order means, such as a foot switch. Expressing this in drivers' terms, the invention provides a "flash" improvement so that if a discourteous or careless oncoming driver fails to dim down, the full-intensity light of Bone head lamps can instantaneously be projected down the entire road; by contrast, if the oncoming driver dims down at a range beyond the normal pick-up range of the Bone system, then the Bone system can be made to pick up at long range, thereby projecting light down the right side of the road and casting the shadows down the left side of the road.

For a better understanding of the present invention, together with other and further objects, advantages and capabilities thereof, reference is made to the following description of the accompanying drawings, in which:

Figs. 1a and 1b are circuit diagrams which in composite illustrate the complete circuitry of a head lighting system incorporating the improvements in accordance with a preferred embodiment of the invention;

Fig. 2 is a circuit diagram showing typical filament and chopper motor circuit arrangements suitable for use in the system; and Fig. 3 is a horizontal sectional view through a Bone type direction finder showing a photoelectric tube, and galvanometer, together with the associated arcuate vane, the vane being illustrated in the angular position assumed when no oncoming vehicle is present.

Fig. 4 is a horizontal sectional view through the direction finder and one headlamp, showing their circuit connections.

Referring now generally to Figs. 1a and 1b, attention is first invited to the coils in Fig. 1b for actuating the galvanometer movements to position the vanes of the head lamps and the direction finder. Three of these coils drive the direction finder and head lamp vanes synchronously in azimuth in such a direction as to increase the width of the light cast down the road by an equipped car and to diminish the width of the non-glare shadow. Specifically, there are provided direction finder galvanometer coil 11D, right head lamp galvanometer coil 12R and left head lamp galvanometer coil 13L. It should be borne in mind throughout this discussion that an increase in current through those coils (whether caused by normal automatic operation or by the manual "flash" override) causes the armatures and vanes of each of the galvanometers to turn in a counterclockwise direction, Fig. 3.

Similarly, there are provided, essentially in parallel combination, galvanometer coils 14D, 15R and 16L, for the direction finder and right and left headlamps, respectively. It should be remembered throughout this description that when the combination of coils 14D, 15R and 16L is energized by an increment of current (as in normal automatic operation or in response to the manual "search" override) the operation is such that the vanes and armatures of the head lights and direction finder synchronously rotate in a clockwise direction, as indicated by the legend "CW" placed adjacent these coils.

The arrangement of coils and associated potentiometer circuitry illustrated in Fig. 1b is described and disclosed but not per se claimed herein in that they are claimed in the co-pending patent application of Richard H. Engelmann entitled "Synchronizing and Compensating Circuit for Headlight Control System," Serial No. 715,973, filed February 18, 1958 filed simultaneously herewith and assigned to the same assignee as the present application and invention. Reference is made to such co-pending application for a detailed discussion.

The circuitry illustrated in Figs. 1a and 1b automatically positions the synchronized vanes of a Bone type system in the fashion indicated in the aforementioned Bone patents and also provides "search" and "flash" override controls in accordance with the present invention, together with improved synchronism and compensation as disclosed in the aforementioned co-pending patent application.

Accordingly, the circuitry herein disclosed comprises the following cascaded stages: a phototube stage including phototube 17 (Fig. 1a); a cathode follower stage comprising a triode 18; a tuned amplifier stage comprising a triode 19; further amplifier stages including triodes 20 and 21; a cathode follower stage including triode 22; a transient response compensating network 23; a resistance-capacitance coupled amplifier stage including triode 24 (Fig. 1a); and an output network comprising opposite polarity diode rectifier networks 25 and 26 (Fig. 1b), to which are individually coupled power amplifier stages including pentodes 27 and 28, respectively. The over-all operation of the output networks is such that diode rectifier 25 produces positive voltages which render tube 27 more conductive and therefore produce current flows in coils 14D, 15R and 16L which turn the associated vanes in a clockwise direction, while the diode rectifier system 26 produces negative voltages which render tube 28 less conductive and therefore reduce current flows in coils 11D, 12R and 13L which tend to turn such vanes in a counterclockwise fashion. Therefore the action of the two rectifier systems is supplemental. This over-all operation occurs on an increase in the output voltage from tube 24, as when an oncoming car approaches under normal operating conditions. That is, light from approaching headlamps drives the direction finder vanes clockwise (in such a direction as to cut off the light). Conversely, when the oncoming car has passed, so that radiant energy is not impinging on phototube 17, the signal from amplifier 24 decreases, whereby tube 27 becomes less conductive (the output from rectifier 25 being less positive) and tube 28 more conductive (the output from rectifier 26 being less negative) so that the vanes are actuated in a counterclockwise direction.

In accordance with the invention, we provide a switching network illustrated generally in the lower part of Figs. 1a and 1b, which includes relays 31, 32 and 33, and a foot switch 34 (Fig. 1a), in combination, together with associated electrical and mechanical components including contacts and ganging means 31G, 32G, and 33G (Figs. 1a and 1b). This combination controls the searching and flashing and selecting functions to which the present invention is directed.

Returning to a discussion of the detailed circuitry, the main stages of the system having been pointed out, there is shown a phototube 17 to which radiant energy from point light sources, as for example, the inner head lamp of an oncoming vehicle, is applied. Such radiant energy is in the form of pulses of light, the phototube 17 of the present application preferably corresponding to phototube 13 shown in the co-pending patent application of Harold J. Behm and William Hecox, Serial No. 567,970, filed in the United States Patent Office on February 27, 1956 now United States Patent No. 2,878,396 issued March 17, 1959, entitled "Direction Finder for Automobile Headlighting System" and assigned to the same assignee as the present invention and application.

Reference is made to such co-pending Behm and Hecox application for a detailed description of the preferred means and mode of energization of phototube 17. The invention of the present application is of course not limited to utility with the Behm-Hecox direction finder.

Operating voltage for the phototube is supplied from a high voltage terminal 36 (at plus 300 volts for example) and between such terminal and ground are serially arranged voltage divider resistors 37, 38, 39 and 40. A filter network is made up of resistor 40 and shunt capacitor 41 and their junction is connected through phototube load resistor 42 to the anode of photocell 17, the junction of such resistor 42 and anode being in turn connected to the grid of amplifier triode 18. Due to the fact that the light on the phototube 17 is in pulses, an alternating voltage appears at the grid of triode 18.

Triode 18 includes the usual cathode resistor 43 and connections to the high voltage source and is arranged as a cathode follower so as to provide a low impedance output and a high impedance input suitably matching the phototube circuit. Tube 18 is A.C. decoupled from the power supply by series resistor 38 and shunt capacitor 35.

The output of amplifier stage 18 is coupled as by capacitor 44 and grid resistor 45 to the grid of triode 19, the cathode circuit of which includes cathode resistor 46, bypassed by capacitor 47. The anode load of triode 19 comprises a tuned parallel combination of inductor 48 and capacitor 49. Such tuned combination is connected to the high voltage source through a filter including series resistor 50 and shunt capacitor 51.

The tuned anode circuit of amplifier stage 19 is coupled to amplifier stage 20 through a coupling capacitor 52. In order to provide a double tuned band pass network, with desirable noise rejection characteristics, and a flat double humped pass band of sufficient width (for example 100 cycles) to allow for variations in frequency of the light pulsations on the phototube, there is inserted in shunt with the grid of tube 20 a tuned parallel combination of inductance 53 and capacitance 54. Both tuned circuits 48–49 and 53–54 are tuned approximately to the phototube output signal frequency of 1600 cycles per second, and are overcoupled by capacitance 52. Tube 20 has the usual cathode resistor 55 and by-pass capacitor 56 and its cathode is connected by conductor 177 to shield 178 in order to minimize stray pick-up.

Tube 20 is A.C. decoupled from the high voltage terminal 36 by a network comprising series resistor 57, shunt capacitor 58, and dropping resistor 59.

Tube 20 is in turn coupled to amplifier stage 21 by coupling capacitor 60 and adjustable grid resistor 61. Tube 21 has the usual cathode resistor 62 and by-pass capacitor 63 and is likewise A.-C. decoupled from the high voltage power supply by series resistor 64, shunt capacitor 65, and dropping resistor 66. Tube 21 is in turn directly coupled to triode 22 which has a cathode resistor 67 and a direct anode connection to terminal 36.

The output of stage 22 is coupled, via series coupling capacitor 68 and shunt resistor 69, to a time-dependent, non-linear compensating network. Several such networks are known in the art. That here shown for purposes of illustration but not limitation is described in the literature, and the circuit parameters are set forth below. It comprises a pair of oppositely-poled rectifier branch circuits including diodes 70 and 71, each in series with a parallel resistance-capacitance network, such networks being designated by the reference numerals 72–73 and 74–75. The output of such compensating network is coupled to the grid circuit of amplifier stage 24 by shunt resistance 77 and series resistance 78. Amplifier stage 24 includes plate supply resistor 79 and cathode resistor 80, by-passed by capacitor 81.

The over-all operation of the circuitry so far described in detail, i.e., phototube 17 and stages in cascade therewith, is that there is produced at the output circuit of tube 24 an alternating wave signal which is utilized to control the Fig. 1b circuitry to drive the vanes in such a direction that the direction finder vane tends to cut off the passage of light to the phototube. In normal tracking operation a balance is attained such that the position of the direction finder vane indicates the azimuth of the oncoming light.

The circuitry illustrated in Figs. 1a and 1b is so arranged that when the power supply is disconnected from the system (i.e. the entire system turned off) the galvanometer armatures and vanes are in a central or static position in which the vane aperture 6 (Fig. 3) registers centrally with slot 8 of the phototube housing. When the system is turned on and the power supply connected thereto, the circuitry automatically operates to place the vanes and armatures in the extreme counterclockwise position illustrated in Fig. 3. That is, tube 28 is arranged to be normally conductive so that such tube and its associated galvanometer coils may be thought of, by crude analogy, as performing the gross function of springs which tend to bias each of the vanes into the extreme counterclockwise position. A decrement of current through tube 28 is grossly analogous to relaxation of such springs. Current in tube 27 is analogous to springs which bias the vanes in a clockwise direction. An increment of current in tube 27 causes the same result as the decrement in tube 28, i.e. causes or permits the vanes and armatures to move clockwise. In order to assure the positioning of the vanes in the static position just mentioned, tube 28 is rendered normally conductive by the return of its grid 84 to its cathode 85, via the rectifier load resistor 86. On the other hand, tube 27 is rendered normally of lower conductivity by the return of its grid 87, via series resistor 88 and rectifier load resistor 89 to ground. The cathodes of both tubes 27 and 28 are placed in a position above ground by connection to a positive terminal 90 (at plus 12.0 volts, for example). It will be seen from the foregoing that as the output from amplifier stage 24 (Fig. 1a) causes greater positive voltages to be produced across resistor 89 and greater negative voltages to be produced across resistor 86, tube 27 will become more conductive and tube 28 less conductive so that the supplemental and cooperative effect of both sets of galvanometer coils is to drive the vanes clockwise. Conversely, as the output signal from amplifier stage 24 decreases in intensity the positive voltage across resistor 89 and the negative voltage across resistor 86 decrease so that then the cooperative and concurrent effect of both sets of coils is to drive the vanes in the counterclockwise direction.

The over-all operation of the system will be apparent in the light of the above description. When the headlights of an approaching car are in the direction finder's field of view, the image of this car's headlights are formed by the lens (Fig. 3). This image is appropriately focused. When the light from this image falls on the phototube, the amplifying system drives the finder vane clockwise toward the spot of light. As soon as the finder vane reaches the light spot, it cuts off light to the phototube. The amplifying system now drives the vane imperceptibly counterclockwise toward its original position, but before it has moved an appreciable distance, the phototube again receives light. This reverses the direction of the drive on the vane. The result is that this finder feedback vane very slightly oscillates at a fairly high rate about the position of the image of an approaching headlight. Thus, the direction finder vane position is an indication of the angular position or direction of the headlight of an approaching car. The headlamp shadow-casting vanes are synchronized with the direction finder vane.

In order to perform the above described operation, two outputs are taken from amplifier stage 24 at 92 and 93 (Fig. 1b) and are individually coupled as by coupling capacitors 94 and 95 to the amplifier networks inclusive of diodes 25 and 26, respectively. Referring to rectifier 25, its anode is connected to ground via a resistor 97 and its cathode to ground via resistor 89 and the shunt filter capacitor 98, to the end that unidirectional voltages of positive polarity are applied to the grid of the tube 27 via series resistor 88.

Referring now to rectifier 26, its cathode is connected to cathode 85 via resistance 100 and its anode is connected to the same point via rectifier load resistance 86, shunted by filter capacitor 101, to the end that unidirectional voltages of negative polarity appear across rectifier load resistor 86 and are applied to the grid circuit of tube 28 to render it less conductive when increasing light is applied to phototube 17. The anode of rectifier 26 is connected directly to grid 84.

Parenthetically referring to Fig. 2 for the moment, the filaments of the tubes 103, 28, 27, 22 and 24 (one envelope) and 20—21 (one envelope) are arranged in parallel and numbered 105, 106, 107, 108 and 109, respectively. The filament 110 of tubes 18 and 19 (one envelope) is connected to a dropping resistor 111 and filter capacitor 112, and powered at reduced voltage, as shown. Similarly, the chopper motor 115 (designated as element 27 in Fig. 2 of the aforementioned Behm and Hecox patent application, Serial No. 567,970) is provided with a dropping resistor 113 and filter capacitor 114.

Referring now to the lower portion of Fig. 1a and the associated Fig. 1b circuitry with which the present invention is principally concerned, attention is first directed to the two principal control functions thereof. Closure of foot-switch 34 automatically initiates either a searching or a flashing operation, as road conditions require. The intensity of the signal present at conductor 120, connected to the output of tube 21, depends on the nature of such conditions and, upon closing of switch 34, sets into operation circuitry which, in accordance with the invention, causes the system to "flash" or to "search," depending on which function was automatically selected. To this end, there is provided a sensing relay 31 which is deenergized when the light input to phototube 17 is below a certain threshold value. When such light input is above such threshold value relay 31 is energized. Relay 31 is therefore an amplitude-sensitive device which determines whether a searching or flashing function will be performed by the actuation of switch 34, searching being performed when the light signal input to phototube 17 is below the threshold (as when an approaching car with dim lights is beyond the dim light pickup range), flashing being performed when such light input is above the threshold value.

Referring now to the means for energizing sensing relay 31, it will be seen that the coil of this relay is in a series circuit comprising high voltage terminal 36, resistor 121, triode 103, and low voltage battery terminal 90 so that relay 31 is energized when tube 103 is conductive. Tube 103 becomes conductive when the signal applied to its grid exceeds the threshold value. To that end conductor 120 couples the plate of tube 21 to the grid of tube 103 through a detector network comprising a two-stage series capacitance shunt resistance filter 122, 123, 124, 125, a series diode rectifier 126 and a shunt rectifier load network comprising resistor 127 and capacitor 128, the latter network being connected to the grid of tube 103 via an adjustable contact 129 on potentiometer 127. The purpose of the two-stage filter network is to eliminate low frequency voltages which may be due to pick-up from the voltage regulator of the car or commutator noise from the automobile generator. The threshold at which tube 103 is rendered conductive and relay 31 energized is determined by the position of contact 129 on resistor 128.

When relay 31 is energized, as by normal pickup of an oncoming car, it dictates that a flashing operation shall be initiated when foot switch 34 is closed. This control is exercised via ganging means 31G, which in turn controls pairs of contacts 130 and 131 in such a way that, when energized, relay 31 opens contacts 130 and closes contacts 131. Contact pairs 130 and 131 are severally in series circuit with the coils of a search relay 32 and a flash relay 33, and between such coils and supply terminal 90. When contacts 130 are opened the search relay 32 is open-circuited and cannot be energized by closure of switch 34. This means that the search function is performed only in the absence of normal automatic pickup. When contacts 131 are closed, the flash relay 33 can be energized by closure of switch 34. This means that the flash function is performed only when pickup has already occurred. Such closure of switch 34, for the flash operation, causes flash relay 33 to be energized. It will be seen, therefore, that amplitude-sensitive selector device 31, by controlling contacts 130 and 131, automatically disables the search relay 32 (by opening 130) and "sets up" flash relay 33, if the signal intensity on line 120 indicates that pickup has occurred. The two low-potential leads of the coils for relays 32 and 33 are connected together and the junction goes to ground, via switch 34.

Flash relay 33 controls, as by ganging means 33G, two sets of contacts 133, 134 (Fig. 1b), closing of the former of which connects grid 87 to ground, reducing conduction in tube 27, closing of the latter of which connects grid 84 directly to cathode 85 and increases the conduction of tube 28, with the result that the vanes are moved in a counterclockwise direction for "flash."

It will be seen from the foregoing that flash relay 33 is simply a bias switching device which controls contacts 133, 134 to bias counterclockwise-actuating tube 28 into more conductivity and clockwise-actuating tube 27 into less conductivity. At the conclusion of the "flash" operation, the coil of 33 is deenergized and contacts 133 and 134 are opened.

Since switch 34 is a momentary switch, with no associated holding contacts for the flashing operation, the system instantly returns to its normal automatic operation when switch 34 opens after it is momentarily closed. The over-all effect of closure of switch 34, under such conditions that the light input to phototube 17 is above that corresponding to the threshold, is that the vanes are moved counterclockwise. Let us now consider the cycle of operation for searching.

When the light input to phototube 17 is below that which corresponds to threshold value of signal on line 120, tube 103 is non-conductive and relay 31 is deenergized, closing contacts 130 and openings contacts 131 (as shown in Fig. 1a). Since contacts 131 are open the flashing relay 33 cannot be energized by closure of switch 34 and therefore contacts 133 and 134 are also open (as shown in Fig. 1b). However, the closing of contact 130 "sets up" relay 32 and permits the momentary closing of switch 34 to energize relay 32. Search relay 32 is provided with its own holding contacts 136, connected in parallel with switch 34, to insure that sufficient clockwise rotation of the galvanometer occurs during the search operation. The coil of relay 32 is in series with low voltage power supply terminal 90 and also with momentary switch 34 and holding contacts 136, so that sustained energization of relay 32 for a predetermined period is assured when the momentary switch 34 is closed. Relay 32 includes ganging means 32G which not only effects closure of holding contacts 136, upon energization of the relay, but which also performs three other functions:

First, the closing contacts 137 (connecting grid 84 to ground and cutting off tube 28);

Second, the closing of contacts 138 (connecting cathode 139 to grid 87 through resistor 88), thereby rendering tube 27 more conductive, tubes 27 and 28 therefore functioning cooperatively to turn the vanes in a clockwise direction;

Third, the opening of contacts 140 and the closing of contacts 141, which causes the grid of tube 103 to be biased below cut-off for a predetermined period, assuring that sensing relay 31 will remain deenergized while the searching operation continues for a sufficient period to permit approach of the oncoming car within pickup range. Opening of 140 and closing of 141 introduce a bias voltage having an initial value equal to that of the low voltage supply, between the grid and cathode of tube 103. This voltage leaks off at an exponential rate, depending on the time constant of a resistor 143 and capacitor 144. That is to say, prior to the opening of contacts 140 and the closing of contacts 141, there was no fixed bias on the grid of tube 103 and the input signal to that tube was inadequate to energize sensing relay 31. Upon the closing of contact 141 and the opening of contact 140, the grid of tube 103 is placed at ground potential because of the fact that capacitor 144 has previously acquired a charge via the circuit 90, 144, 140 and ground. The cathode of tube 103 is above ground potential, being connected to terminal 90.

For the reasons stated, the energization of relay 32 initially operates to assure cut-off of tube 103. The charge across capacitor 144 leaks of exponentially through the discharge path 144, 143 in a manner dictated by the time constants of that network so that ultimately the exponentially decreasing bias which holds tube 103 non-conductive is dissipated, permitting 103 to be rendered conductive. In fact, conduction of tube 103 is assured at the end of such leakage, by so proportioning resistor 143 and that portion of potentiometer 127 between contact 129 and ground, the latter being relatively large, that the grid of tube 103 is very much closer to cathode potential (above ground) than to ground potential. When tube 103 becomes conductive, relay 31 is energized, which opens contacts 130, deenergizing search relay 32. Deenergization of relay 32 opens contacts 141, and closes contacts 140 (allowing the potential of the grid of tube 103 to be determined by the signal at 129). Deenergization of relay 32 also opens contacts 136, 138 and 137, permitting the system to go back to automatic operation.

We have seen that energization of relay 31 is caused at the end of the search operation by the leak-off of charge from capacitor 144. It will be understood that such energization can also be accomplished by an increase in the light level at phototube 17 as would be occasioned by sufficiently great clockwise swing of the vanes, i.e., by pickup of an oncoming car.

Relay 32 is a bias-switching device which controls contacts 138 and 137 to bias tube 27 into more conductivity and tube 28 into less conductivity to move the vanes clockwise. It is also a holding device which controls contacts 136 to keep its own coil energized. It is, further, a delay device which controls contacts 140—141 to provide for a predetermined search period.

In order to provide for the operations above described, two branch circuits are established between terminal 90 and ground. One of these branch circuits comprises the coil of search relay 32, sensing relay contacts 130, and search relay holding contacts 136, in parallel with momentary switch 34. The other of these branch circuits comprises sensing relay contacts 131, the coil of flash relay 33, and momentary switch 34. It has been seen that energization of sensing relay 31 dictates the closing of contacts 131 and the opening of contacts 130 and therefore the automatic selection of the flash function while deenergizing of sensing relay 31 dictates the closing of contacts 130 and the opening of contacts 131, and therefore the selection of the search function. Energizing of flash relay 33 causes the flashing function to be performed by reason of the resultant closure of bias-switching contacts 133 and 134. Energizing of relay 32 causes the search function to be performed by closure of bias-switching contacts 137 and 138 and sets up conditions for predetermined duration of the search function by closure of contact 141 and opening of contact 140. Termination of the flashing function by deenergizing of relay 33 is assured through mere release of switch 34 because there are no holding contacts.

Termination of the searching function is assured by energizing of relay 31 and resultant deenergizing of relay 32 and this occurs because of the fact that the grid of tube 103 reaches such a level as to assure conductivity of that tube either because of the attainment of sufficient signal intensity at contact 129 or because of leakage of bias from capacitor 144 and when such termination occurs by energizing of relay 31 and resultant cut-off of search relay 32, capacitor bias is removed from the grid of tube 103. The reason for this is that when relay 32 is deenergized contact 140 is closed and contact 141 is opened. Contacts 136, 137 and 138 are simultaneously opened.

To recapitulate, the system can "track" on sources having only a fraction of the intensity required for initial "pickup." The direction finder-controller constitute a closed loop control system whose principal purpose is to determine the position of oncoming point sources of light which have an intensity above 0.0266 foot-candles (standard high beams at 1500 feet) and which will continue to determine the position of down beams at 1500 feet.

In order to cause the system to continue to track on cars which dim immediately after the system begins to "track" on them, a means is provided to increase the sensitivity of the system when it first "picks up" on oncoming lamps. This is accomplished by providing filter 5 on the direction finder vane. This filter is in such a position that it entirely covers the phototube when the vanes are in the retracted or counterclockwise position. In this position, the filter produces an effective attenuation of 20 or 25 to one on the center line of the field of the direction finder and for lights to the right of center line, and progressively less for lights to the left of center line until a clear area is reached next to the opaque portion 7. When the intensity of illumination from an oncoming car reaches 0.0266 foot-candles, the vane begins to swing clockwise so as to bring the opaque portion toward the headlamp image. The image, therefore, is in progressively less dense portions of the filter 5, causing increasing signal and progressively more rapid motion of the vane until the opaque portion 7 is reached and the tracking action described above begins. The phototube therefore has 20 to 25 times as much light reaching it under these conditions as it does just before the system "picked up." Thus immediate dimming of the opposing headlamps will cause the effective illumination reaching the phototube to be no less than the illumination seen previously through the filter 5 and the system will continue to track.

Because of this filter on the direction finder vane, cars with down beams will approach much closer than 1500 feet before "pickup" will occur automatically. We have seen that the invention provides a means by which the driver of the equipped car can initiate a "search" operation and cause "pickup" to occur at distances up to 1500 feet. This is described in detail above.

If a car approaches on down beams, it would be possible for the system to "track" it at distances of about three-tenths of a mile but not to pick it up automatically at that distance. The "search" function provides for such situations. If relay 32 is energized, tube 28 stops conducting and 27 conducts at its maximum until the vanes have swung clockwise about half way through their travel, at which time the system is returned to automatic operation. This places the thin portion of the filter or the open slit 6 of the direction finder vane in such a position that the light from oncoming cars will shine through, and the system can begin tracking.

Referring now to the galvanometer coil circuits in Fig. 1b, each coil is provided with a parallel damping resistor as shown, the resistors being numbered 150, 151, 152, 153, 154, and 155.

The screen grids of tubes 27 and 28 are connected to the anodes by low resistors 156 and 157, respectively, so that the operation is essentially triode operation. The anode of tube 27 is connected to an adjustable contact on balancing resistor 158 and the anode of tube 28 is connected to an adjustable contact on balancing resistor 159. One terminal of resistor 158 is connected through a resistance-capacitance anti-hunting network 160, 161, to the direction finder coil 14D. The other terminal of balancing resistor 158 is connected to an adjustable contact on balancing resistor 162 and the leads of such resistor are connected, via resistors 163, 164, to galvanometer coils 15R and 16L, respectively.

The right hand coils are similarly arranged, one lead of balancing resistor 159 being connected to the direction finder coil 11D through a resistance-capacitance, anti-hunting network 167, 168, and the other lead of the balancing resistor being connected to an adjustable contact on balancing resistor 170, the leads of which are connected by resistors 171, 172 to the head lamp galvanometer coils 13L and 12R, respectively. As previously indicated, all six coils are connected to power supply terminal 36. The contacts 137 are connected between grid 84 and ground, and contacts 138 between the cathode of rectifier 25 and the cathode of tube 27. Contacts 133 are connected between grid 87 and ground and contacts 134 between grid 84 and cathode 85.

The positioning of the adjustable contact on balancing resistor 158 determines the relative distribution of current as between the direction finder clockwise-moving galvanometer coil on the one hand and the corresponding head lamp galvanometer coils on the other. Positioning of the adjustable contact on resistor 159 determines the distribution of current between the counterclockwise direction finder galvanometer coil on the one hand and the corresponding head lamp coils on the other. The position of the sliding contact on balancing resistor 162 determines the distribution of current as between the two clockwise head lamp galvanometer coils and, similarly, the position of the sliding contact on galvanometer 170 determines the distribution of current as between the two counterclockwise head lamp galvanometer coils. It will be seen that this arrangement permits considerable flexibility of adjustment and other advantages mentioned in the copending patent application of Richard H. Engelmann, to which previous reference has been made.

While we do not intend to be limited to the parameters now to be mentioned, the following parameters have been found to be satisfactory in one successful embodiment of the present invention and they are furnished by way of illustration.

Resistor: Value (ohms unless otherwise stated)
- 39 ..... 2.2 megohms.
- 40 ..... 1.0 megohm ½ watt paralleled by 1.5 megohm ½ watt.
- 42 ..... 20 megohms precision.
- 43 ..... 100 thousand ohms.
- 45 ..... 2.2 megohms ½ watt.
- 38 ..... 10,000 ohms—½ watt.
- 50 ..... 10,000 ohms—1 watt.
- 46 ..... 4,700 ohms—1 watt.
- 37 ..... 470,000 ohms—½ watt.
- 57 ..... 10,000 ohms—2 watts.
- 59 ..... 330,000—1 watt.
- 55 ..... 4,700—1 watt.
- 61 ..... 1 megohm potentiometer.
- 64 ..... 100,000 ohms—1 watt.
- 66 ..... 470,000 ohms—½ watt.
- 62 ..... 10,000—½ watt.
- 67 ..... 100,000—1 watt.
- 69 ..... 10,000—½ watt.
- 73 ..... 470,000—½ watt.
- 75 ..... 470,000—½ watt.
- 77 ..... 15,000 ohms—½ watt.
- 78 ..... 100,000 ohms—½ watt.
- 79 ..... 33,000 ohms—1 watt.
- 80 ..... 4,700 ohms—1 watt.
- 150, 151, 152, 153, 154, 155 } 1,000 ohms precision.
- 161 ..... 7,500—5 watts.
- 163, 164, 171, 172 } 6,300—5 watts.
- 167 ..... 7,500—5 watts.
- 158, 162, 170, 159 } 500 ohms—1 watt—screw-driver potentiometer.
- 156 ..... 150—½ watt.
- 157 ..... 150 ohms—½ watt.
- 97 ..... 100,000 ohms—½ watt.
- 89 ..... 1.0 megohm—½ watt.
- 88 ..... 100,000 ohms—½ watt.
- 86 ..... 1.0 megohm—½ watt.
- 100 ..... 100,000 ohms—½ watt.
- 121 ..... 15,000 ohms—2 watts.
- 123 ..... 470,000 ohms—½ watt.
- 125 ..... 470,000 ohms—½ watt.
- 127 ..... 2.0 megohms—potentiometer.
- 143 ..... 8,200—½ watt.
- 111 ..... 25 ohms—10 watts paralleled by 100 ohms—1 watt.
- 113 ..... 220 ohms—1 watt.

Capacitors: Values
- 41 ..... 2 microfarads—150 volts electrolytic.
- 35 ..... 20 microfarads—400 volts electrolytic.
- 44 ..... 470 micromicrofarads.
- 49 ..... about 0.2 microfarad.
- 47 ..... 2.5 microfarads—25 volts electrolytic.
- 51 ..... 20 microfarads—400 volts electrolytic.
- 179 ..... 10 microfarads—450 volts electrolytic.
- 52 ..... 6500 micromicrofarads.
- 54 ..... about 0.14 microfarad.
- 58 ..... 10 microfarads—450 volts—electrolytic.
- 56 ..... 2.5 microfarads—25 volts electrolytic.
- 60 ..... 2000 micromicrofarads.
- 65 ..... 10 microfarads—450 volts electrolytic.
- 63 ..... 2.5 microfarads—25 volts electrolytic.
- 68 ..... 0.1 microfarad—400 volts.
- 72 ..... 0.05 microfarad—400 volts.
- 74 ..... 0.05 microfarad—400 volts.
- 81 ..... 50 microfarads—25 volts electrolytic.
- 160 ..... 1.5 microfarads—200 volts.
- 168 ..... 1.5 microfarads—200 volts.
- 94 ..... 0.1 microfarad—400 volts.
- 95 ..... 0.1 microfarad—400 volts.
- 98 ..... 2200 micromicrofarads.
- 101 ..... 2200 micromicrofarads.
- 122 ..... 1000 micromicrofarads.
- 124 ..... 0.01 microfarad.
- 144 ..... 0.25 microfarad.
- 114 ..... 10 microfarads—15 volts electrolytic.
- 112 ..... 500 microfarads—12 volts electrolytic.
- 128 ..... 0.05 microfarad.

Inductances: Type
- 48 ..... UTC MQE5. (United Transformer Corporation.)
- 53 ..... UTC MQE6.

Tubes: Type
- 17 ..... 918.
- 18, 19 ..... ECC 83 (12AX7).
- 20, 21 ..... ECC 83 (12AX7).
- 22 ..... 12AX7.
- 27 ..... 12BK5.
- 28 ..... 12BK5.
- 103 ..... 12AT7.

Diodes: Type
- 70, 71 ..... 1N55's or 1N67's.
- 25, 26 ..... 1N93's.
- 126 ..... 1N55.

Relays: Type
- 31 ..... Advance Relay Cat. #SV1C22OOD.
- 32 ..... Guardian Series 200—12 volt 4PDT.
- 33 ..... Guardian Series 200—12 volt DPDT.

Switches: Type
- 34 ..... Momentary contact foot switch.

Galvanometers: Type
- 11D, 14D; 12R, 15R; 13L, 16L ..... Sanborn Model 51–500S Galvanometer modified by removing lower suspension.

Motors: Type
- 115 ..... Kinder Co.—controlled 6 v. D.C.

Power Supply Type
- Cornell-Dubiler Mobilpak Power Con Model 12DC3.

Voltage: Value
- At Terminal 90 ..... Plus 12 volts.
- At Terminal 36 ..... Plus 300 volts.

While there has been shown and described what is at present considered to be the preferred embodiment of the invention, it will be understood by those skilled in the art that various changes and modifications may be made therein without departing from the true scope of the invention as defined in the appended claims.

Having fully disclosed our invention, we claim:

1. In a vehicle headlighting system of the type in which shadow-casting and bearing-indicating vanes are synchronously angularly positioned in accordance with the relative bearing of a light source and which includes a first means including a vacuum tube and utilizing the output of said tube for driving at least one of said vanes in one angular direction, a second means including a second vacuum tube and utilizing the output of said second tube for driving said vane in the opposite angular direction, each of said vacuum tubes having anode, cathode and control electrodes, means for supplying positive output voltage to the control electrode of the first vacuum tube to drive the vanes clockwise on increase of such voltage, means for supplying a negative voltage to the second tube to drive the vanes clockwise on increase of such negative voltage, input signal means common to said voltage supplying means, said vane being driven clockwise on input signal increase and counterclockwise on input signal decrease, an improvement for causing said vanes to assume a predetermined intermediate position in the quiescent condition, comprising, in combination, means for biasing the cathodes of both tubes positive relative to ground, resistive connections between the control electrode of the first tube and ground to render it non-conductive in the absence of input signal and resistive connections between the control electrode of the second tube and its cathode to render it conductive in the absence of input signal, the first tube being nonconductive on application of power but in absence of input signal and the second tube being conductive on application of power and absence of input signal to turn the vane to a predetermined counterclockwise position.

2. In a vehicle headlamp system the combination in accordance with claim 1 in which the controlling effect of the input signal, increment of which drives the vane clockwise, is manually overcome to drive the vane counterclockwise, said combination including normally open switching means directly between control electrode and ground of the first tube and normally open switching means directly between control electrode and cathode of the second tube, and flashing means for closing both of said switching means to cut off the first tube and render the second tube heavily conductive.

3. In a vehicle headlamp system, the improvement in accordance with claim 2, in which the controlling effect of initial tube bias, which causes the vanes to assume a counterclockwise position in the absence of sufficient input signal, is manually overcome to drive the vanes clockwise, said combination including normally open switching means between the cathode of the first tube and a point on the grid-ground resistive network which is above ground potential, normally open switching means between the control electrode of the second tube and ground, and searching means for closing both of said switching means to reduce the conductivity of the second tube and render the first tube highly conductive.

4. In a vehicle headlamp system of the type including at least one angularly positioned shadow-casting vane, positioning circuit means including a pair of biased active circuit elements for utilizing the opposing effects of their two outputs to turn said vane in one direction or the other, and common signal channel means for applying input signals to said positioning circuit to determine the position of said vane, an improved override comprising bias switching means for controlling the conductivity of said active elements to turn the vane counterclockwise, and a second override comprising bias switching means for controlling the conductivity of said active elements to turn the vane clockwise.

5. In a vehicle headlamp system, the improvement in accordance with claim 4, in which the first and second overrides for flashing and searching, respectively, comprise relays having coils in parallel energizing paths, and a momentary switch in series with the junction of said coils.

6. In a vehicle headlamp system the improvement in accordance with claim 5 and selector means having a first pair of contacts in circuit with the first override relay coil and a second pair of contacts in circuit with the second override coil, a selector relay, and means for controlling the selector relay to close one of said pairs of contact preparatory to closing of the momentary switch, whereby either the flash or search relay is energized.

7. In a vehicle headlamp system, the improvement in cordance with claim 6, in which the means for controlling the selector relay comprises a coil and sensing tube means for energizing the relay coil so that when energized, it closes the flash-relay contacts and so that, when deenergized, it closes the search-relay contacts.

8. In a vehicle headlamp system, the improvement in accordance with claim 7 in which the anode of said sensing tube means is in series with the selector relay coil, and the tube has an anode and cathode and control electrode.

9. In a vehicle headlamp system, the improvement in accordance with claim 8 and means for coupling the control electrode input circuit of said sensing tube means to the input signal channel so that the condition of conductivity of said tube is automatically controlled by said input signal so that the system flashes when input signals exceed a predetermined level of intensity but searches when such signals are below such level.

10. In a vehicle headlamp system, the improvement in accordance with claim 9 and an energy-storage time-constant device, a source of energy, a pair of contacts controlled by the search relay for connecting said device to the source for charging the device when the search relay coil is deenergized but for connecting said device between grid and cathode of said sensing tube to bias the tube off for a predetermined period when the search relay is selected, and holding contacts in parallel with said momentary switch and controlled by such search relay to maintain the search relay coil in energized condition until the input signal level becomes sufficiently large to render said sensing tube conductive and until the energy-storage device has sufficiently discharged to permit said sensing tube to become conductive.

11. In a vehicle headlighting system of the type including a photoelectric signaling system and a headlamp automatically controlled by such system to assume a normal driving condition or a condition protective of an oncoming vehicle, the improvement comprising, in combination: means for overriding the automatic control of the signaling system to put the headlamp in the normal driving condition, means for overriding the control of the signaling system to put the headlamp in the condition protective of an oncoming vehicle, and selector means responsive to signals in said system to render operative that one of the last-mentioned two means which contradicts the automatic control of the system.

12. In a headlighting system, the improvement in accordance with claim 11 in which the first-mentioned overriding means comprises flash relay circuitry, the second-mentioned overriding means comprises search relay circuitry and the selector means comprises sensing relay circuitry.

13. In a headlighting system, the improvement in accordance with claim 12 in which the selector means comprises, a manual operator switch, a signal-level detector, a selector relay in series with the detector, and contacts positioned by the selector relay for disabling the flash relay circuitry when the signal level in the system is below a threshhold value and disabling the search relay circuitry when the signal level in the system exceeds such threshhold value.

14. In a vehicle headlighting system of the type including a photosensitive system and a headlamp automatically controlled by such system to assume a normal driving condition or a condition protective of an oncoming vehicle, the improvement comprising, in combination: manually operative means for overriding the automatic control of the photosensitive system to put the headlamp in the normal driving condition, and means controlled by the photosensitive system for disabling the manually operative means when the photosensitive means dictates such condition.

15. In a vehicle headlighting system of the type including a photosensitive system and a headlamp automatically controlled by said system to assume a normal driving condition or a condition protective of an oncoming vehicle, the improvement comprising, in combination: manually operative means for overriding the automatic control of the photosensitive system to put the headlamp in the condition protective of an oncoming vehicle, and means controlled by the photosensitive system for disabling the manually operative means when the photosensitive means dictates such condition.

16. In a vehicle headlighting system of the type comprising synchronized shadow-casting and bearing-indicating vanes which are angularly positioned in accordance with the relative bearing of a light source, a first means including a first tube for driving at least one of said vanes in one angular direction to enlarge the shadow cast, a second means including another tube for driving said vane in the opposite angular direction to contract the shadow cast, the prevailing output determining the direction in which the vane turns, and a photoelectric signaling means for actuating both of said first and second means, the improvement which comprises overriding means including a switch for biasing at least one of said tubes to enlarge the shadow cast.

References Cited in the file of this patent

UNITED STATES PATENTS

| | | |
|---|---|---|
| 2,562,258 | Bone | July 31, 1951 |
| 2,753,487 | Bone | July 3, 1956 |
| 2,767,347 | Miller et al. | Oct. 16, 1956 |